(12) United States Patent
Jonsson

(10) Patent No.: US 10,698,554 B2
(45) Date of Patent: Jun. 30, 2020

(54) POSITIONING COMPONENTS THAT PROVIDE RESISTANCE ON SENSE LINES OF A TOUCH SENSOR

(71) Applicant: Microchip Technology Incorporated, Chandler, AZ (US)

(72) Inventor: Carl Olof Fredrik Jonsson, Gavle (SE)

(73) Assignee: Microchip Technology Incorporated, Chandler, AZ (US)

( * ) Notice: Subject to any disclaimer, the term of this patent is extended or adjusted under 35 U.S.C. 154(b) by 53 days.

(21) Appl. No.: 15/904,123

(22) Filed: Feb. 23, 2018

(65) Prior Publication Data

US 2018/0314367 A1 Nov. 1, 2018

Related U.S. Application Data

(60) Provisional application No. 62/491,993, filed on Apr. 28, 2017.

(51) Int. Cl.
| | | |
|---|---|---|
| *G06F 3/045* | (2006.01) | |
| *G06F 3/041* | (2006.01) | |
| *G06F 3/043* | (2006.01) | |
| *G06F 11/00* | (2006.01) | |
| *B23P 19/04* | (2006.01) | |
| *G06F 3/044* | (2006.01) | |

(52) U.S. Cl.
CPC .............. *G06F 3/045* (2013.01); *B23P 19/04* (2013.01); *G06F 3/043* (2013.01); *G06F 3/044* (2013.01); *G06F 3/0412* (2013.01); *G06F 3/0418* (2013.01); *G06F 11/002* (2013.01); *G06F 2203/04103* (2013.01)

(58) Field of Classification Search
CPC ...... G06F 3/045; G06F 3/0418; G06F 3/0412; G06F 3/043; G06F 11/002; G06F 3/044; G06F 2203/04103; G06F 3/0416; G06F 3/04164; B23P 19/04
See application file for complete search history.

(56) References Cited

U.S. PATENT DOCUMENTS

| | | | |
|---|---|---|---|
| 2011/0254805 A1* | 10/2011 | Tanimizu | G06F 3/0416 345/174 |
| 2012/0146941 A1* | 6/2012 | Shin | G06F 3/045 345/174 |
| 2014/0306923 A1 | 10/2014 | Brillant et al. | |

(Continued)

*Primary Examiner* — Adam R. Giesy
(74) *Attorney, Agent, or Firm* — TraskBritt

(57) ABSTRACT

In certain embodiments, a system includes first and second resistive components and a touch sensor controller. The first component is positioned on a first sense line connected to an in-cell touch sensor. The first resistive component is set to a value modifying an RC time constant of a first electrode of the touch sensor. The second resistive component is positioned on a second sense line connected to the in-cell touch sensor. The second component is set to a value modifying an RC time constant of a second electrode of the touch sensor. The value of the modified RC time constant of the first electrode is within 100% of the value of the modified RC time constant of the second electrode. The controller receives signals from the first and second sense lines, such that the first and second resistive components are between the controller and the first and second electrodes, respectively.

25 Claims, 8 Drawing Sheets

(56) References Cited

U.S. PATENT DOCUMENTS

2015/0212644 A1* 7/2015 Noto .................... G06F 3/0416
                                                        345/174
2015/0338956 A1* 11/2015 Ikeda .................. H05K 1/0298
                                                         345/174

* cited by examiner

POSITIONING COMPONENTS THAT PROVIDE RESISTANCE ON SENSE LINES OF A TOUCH SENSOR

CROSS-REFERENCE TO RELATED APPLICATION

This application claims the benefit under 35 U.S.C. § 119(e) of U.S. Provisional Patent Application Ser. No. 62/491,993, filed Apr. 28, 2017, the entire contents and disclosure of which is hereby incorporated by this reference.

TECHNICAL FIELD

The present disclosure relates, in general, to touch detection and, more specifically, positioning components to provide resistance on sense lines of a touch sensor.

BACKGROUND

According to an example scenario, a touch sensor detects the presence and position of an object (e.g., a user's finger or a stylus) within a touch-sensitive area of a touch sensor array overlaid on a display screen, for example. In a touch-sensitive-display application, a touch sensor array allows a user to interact directly with what is displayed on the screen, rather than indirectly with a mouse or touch pad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other device. A control panel on a household or other appliance may include a touch sensor. There are a number of different types of touch sensors, such as for example resistive touch sensors, surface acoustic wave touch sensors, and capacitive touch sensors.

In one example, when an object physically touches a touch screen within a touch sensitive area of a touch sensor of the touch screen (e.g., by physically touching a cover layer overlaying a touch sensor array of the touch sensor) or comes within a detection distance of the touch sensor (e.g., by hovering above the cover layer overlaying the touch sensor array of the touch sensor), a change in capacitance may occur within the touch screen at a position of the touch sensor of the touch screen that corresponds to the position of the object within the touch sensitive area of the touch sensor. A touch sensor controller processes the change in capacitance to determine the position of the change of capacitance within the touch sensor (e.g., within a touch sensor array of the touch sensor).

BRIEF SUMMARY

One or more embodiments of the present disclosure relate to a system. The system may include a display system, an in-cell touch sensor, a touch sensor controller, a first resistive component, and a second resistive component. The display system may be configured to send a display signal to one or more pixels of a display along a data line, and the display may include display layers. The in-cell touch sensor may include electrodes configured to provide signals for locating touches of the display, and the in-cell touch sensor may include one or more layers embedded within the display layers. In one embodiment, the data line may be capacitively coupled to a first electrode and a second electrode of the electrodes; a first circuit may include the first electrode coupled to a first sense line; and a second circuit may include the second electrode coupled to a second sense line. The touch sensor controller may be configured to receive signals from the first sense line of the first circuit and second sense line of the second circuit. The first resistive component may be associated with the first sense line. In one embodiment, the first resistive component is set to a value and configured to alter a time response of the first circuit. The second resistive component may be associated with the second sense line. In one embodiment, the second resistive component is set to a value and configured to alter a time response of the second circuit.

One or more other embodiments of the present disclosure relate to a system. The system may include a first resistive component, a second resistive component, and a touch sensor controller. The first resistive component may be positioned on a first sense line connected to an in-cell touch sensor. In one embodiment, the first resistive component is set to a value configured to modify an RC time constant of a first electrode of the in-cell touch sensor connected to the first sense line. The second resistive component may be positioned on a second sense line connected to the in-cell touch sensor. In one embodiment, the second resistive component is set to a value configured to modify an RC time constant of a second electrode of the in-cell touch sensor connected to the second sense line. The touch sensor controller may be configured to receive signals from the first and second sense lines.

One or more other embodiments of the present disclosure relate to a method. The method may include determining a first time response for a first electrode of an in-cell touch sensor; determining a second time response for a second electrode of the in-cell touch sensor, wherein the first time response is different than the second time response; and setting one or more resistive components associated with at least one of the first and second electrodes. In one embodiment, a difference between the first time response and the second time response after setting the one or more resistive components is smaller than the difference between the first time response and the second time response before setting the one or more resistive components; the first time response being within 100% of the second time response; and a first noise signal and a second noise signal, emanating from the first and second electrodes, respectively, responsive to a display signal sent along a data line capacitively coupled to both the first and second electrodes, arrive at a touch system closer together in time than they would before the setting of the one or more resistive components.

One or more other embodiments of the present disclosure relate to a system. The system may include a projective touch sensor and a projective touch sensor controller. The projective touch sensor controller may include one or more inputs, and an interface coupling the projective touch sensor to the projective touch sensor controller. In one embodiment, the interface is configured to receive first noise from the projective touch sensor, the first noise having a first phase, and provide second noise to the one or more inputs of the projective touch sensor controller, the second noise having a second phase that is different than the first phase.

One or more other embodiments of the present disclosure relate to a touch screen. The touch screen may include a first resistive component, a second resistive component, and a touch sensor controller. The first resistive component may be associated with a first electrode operably coupled to a first sense line connected to an in-cell touch sensor. In one embodiment the first resistive component is operable to modify a value of an RC time constant of the first electrode. The second resistive component may be associated with a second electrode operably coupled to a second sense line connected to the in-cell touch sensor. In one embodiment the second resistive component is operable to modify a value of an RC time constant of the second electrode. The touch sensor controller may be operably coupled to the first and second sense lines.

One or more other embodiments of the present disclosure relate to a method of tuning a display system comprising a touch screen display panel. The method may include enabling a start-up mode of a display system; and performing linearization of RC time constants associated with one or more electrodes of a touch sensor of the touch screen display panel.

One or more other embodiments of the present disclosure relate to a method of fabricating a touch screen display. The method may include assembling a display panel and a touch sensor; and linearizing RC time constants of electrodes of the touch sensor.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
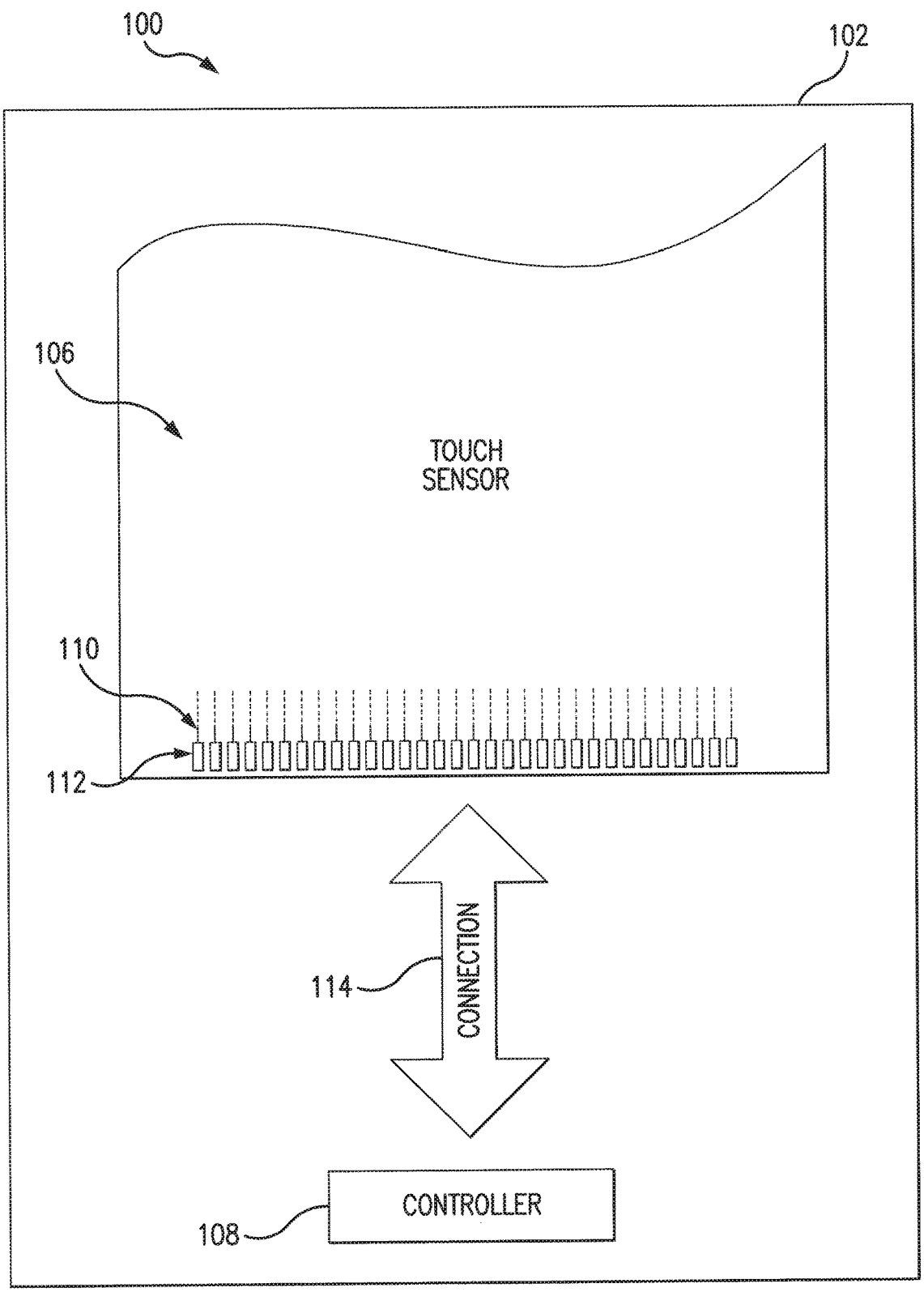
FIG. 1 illustrates an embodiment of a system that includes a touch sensor, according to the present disclosure.

Touch sensors can detect touches and/or objects on or near the touch sensor using various forms of touch sensing. There are a number of different types of touch sensors, such as, for example, resistive touch sensors, surface acoustic wave touch sensors, and capacitive touch sensors. Touch sensors may be integrated into a touch screen in different ways. For example, a touch sensor may be located in a layer between the cover layer and the display screen/panel. As another example, on-cell touch sensors have touch sensors deposited on the cover layer (above the display screen/panel). In yet another example, in-cell touch sensors have touch sensors incorporated within the display screen/panel itself, e.g., between and/or part of display layers of the display.

In an example, a display has many pixels that receive signals refreshing, e.g., an image on the display screen. Activity in the display screen can produce an artifact in the form of noise that interferes with the operation of the touch sensor or touch sensor controller, for example, reducing the sensitivity of the touch screen, producing false touches, masking real touches, etc. In-cell touch sensors can be particularly susceptible to this kind of noise, because the electrodes that comprise the touch sensor are embedded within the display screen/panel itself and are in close proximity to display signals inside the screen, for example, the signals that refresh an image on the display screen. In-cell touch sensors can also be connected to components of the display, which further allow for the introduction of noise into in-cell touch sensors.

In certain embodiments of this disclosure, data lines of the display (which carry signals, e.g., refresh signals or other display activity that may introduce noise) are connected to electrodes of an in-cell touch sensor that is embedded within the display. When signals are sent along the data lines of the display, they produce noise in the electrodes (i.e., noise-coupling occurs between the data lines of the display and sense lines of the touch sensor), which is passed along sense lines from the electrodes to a touch sensor controller. This noise, caused by activity on the display panel, which is manifested as signals passing through the data lines of the display, can interfere with the operation of the touch sensor or touch sensor controller, for example, reducing the sensitivity of the touch screen, producing false touches, masking real touches, etc.

The data lines of the display, in particular embodiments of this disclosure, connect to the electrodes via capacitors, and the electrodes have an associated resistance, e.g., due to resistors or other components on sense lines that run from the electrodes to a touch sensor controller. In certain embodiments, multiple electrodes are connected to a single data line via capacitors, and the resistance between each electrode and the touch sensor controller may vary (e.g., due to different distances from the touch sensor controller or different numbers of resistors between each electrode and the touch sensor, etc.). This creates different RC time constants for each electrode, where $\tau=R*C$. "R" represents the resistance between one electrode and the touch sensor controller, "C" represents the capacitance of the capacitor between the data line and the resistor, and $\tau$ is the product of "R" and "C"—the "RC time constant." The larger the RC time constant, the longer it takes for a signal to travel from the electrode to the touch sensor controller. Because electrodes may have different resistance values, even if they use identical capacitors to connect to a common data line, a noise signal coming from the data line will reach the touch sensor controller at different times. The touch sensor controller will receive the noise signal first from the sense line connected to an electrode with the smallest RC time constant. In such cases, if one attempts to cancel out the noise (or otherwise compensate for the noise) from different sense lines having different RC time constant values by merely summing the non-inverted signal from one sense line with the inverted signal from another sense line, some or all of the noise would still pass because the noise exhibited by the two signals is out of phase in time—for example, some noise on the first sense line would arrive first and not be canceled, while other noise from the second sense line would arrive second and also not be canceled. Thus, noise would still persist.

The integrated noise caused by the activity of the data lines, assuming equal coupling capacitance at each electrode, is canceled when the system has settled. However, it is now understood by the inventor that the intermediate noise current will not cancel due to the non-balanced RC time constants between each sensed electrode, which causes a phase shift at the summing node (e.g., input of a touch sensing controller). As a result, at least two cases might occur, (1) the non-canceled noise may be so large that it saturates the integrator; and/or (2) the noise gets sampled when the touch system samples. In both cases, the touch sensor controller may detect invalid touches, hide real touches, and otherwise "pollute" the signals received at the touch sensor controller.

It may be challenging to synchronize with the activity on the data-lines that causes the noise.

This disclosure contemplates, in certain embodiments, an in-cell display panel (having a touch sensor embedded within the display) where some or all of the sense lines of different electrodes connected to the same data line include a component for providing resistance (e.g., a rheostat or other component), where the component is set or "tuned" to provide resistance to cause the RC time constants for the different electrodes to be more similar, or even the same. This approach, in certain embodiments, causes noise signals from the data line to arrive at the touch sensor controller at the same time (or closer in time), and thus the noise signals can be more effectively canceled out before reaching the touch sensor controller (e.g., with a differential-circuit) or even at the touch sensor controller. Tuning may be performed at any time once the display panel and touch sensor have been integrated, though in some embodiments it may be performed at integration of the display panel and the touch sensor and/or during run-time.

Particular embodiments of the present disclosure may offer certain technical advantages, some of which are detailed in this disclosure. Additional technical advantages are contemplated and are understood by persons of skill in the art. The in-cell touch sensor, display panel, and other components (alone or in combination) of certain embodiments of this disclosure may allow noise to be reduced or eliminated. In addition, in particular embodiments of the present disclosure, using components proving resistance (e.g., rheostats) to account for RC time constant differences between electrodes, and thus reduce noise, in such a system can allow the system to run at higher gains without saturation, require less digital filtering, and/or improve the signal-to-noise ratio (SNR). Certain embodiments may allow touches to be successfully and accurately detected at any time, not just when noise is not present. Moreover, some embodiments increase the speed at which a touch sensor (or touch controller or any other portion of a touch system) can operate. In particular embodiments, when a touch and display system are running asynchronously, which may increase the chance of noise interfering with touch detection under certain conditions, a touch sensor (or touch controller or any other portion of a touch system) may operate with an improved signal-to-noise ratio and/or with an increased speed.

Figure 2:
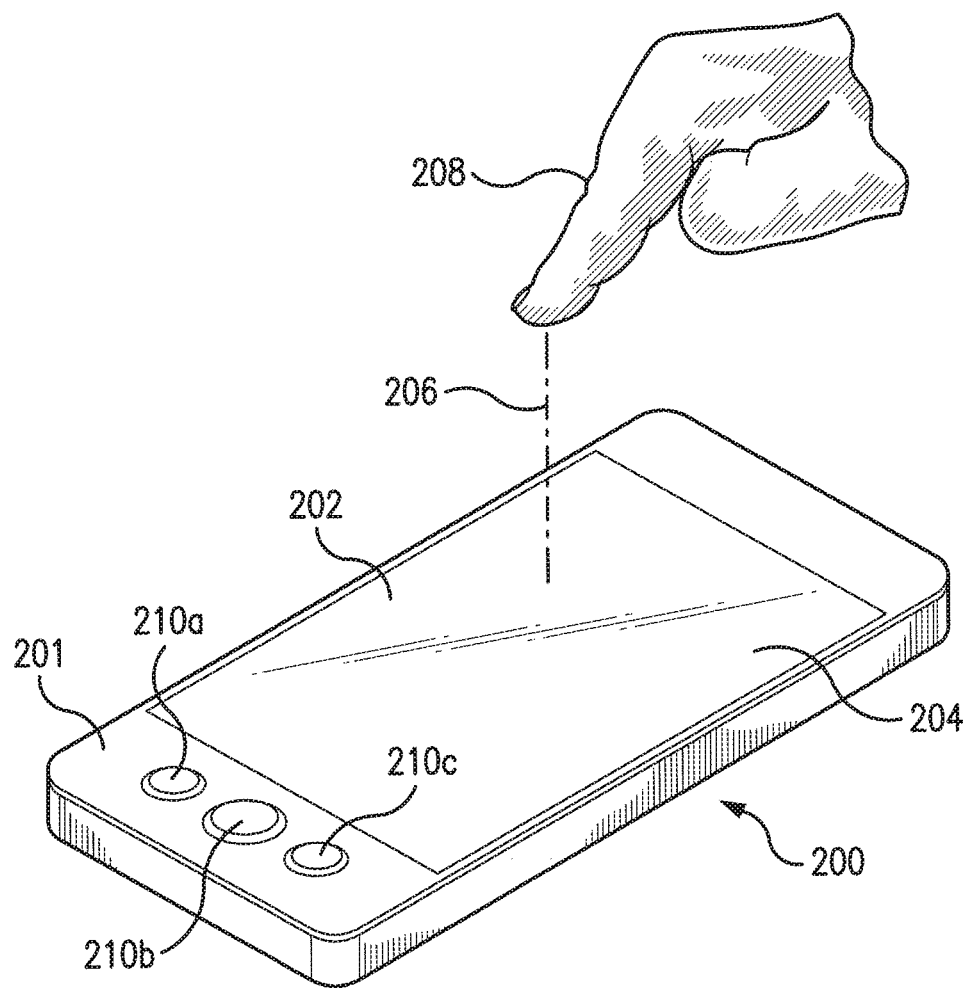
FIG. 2 illustrates an embodiment of a device that houses the touch sensor of FIG. 1 and/or the display panel including an in-cell touch sensor of FIG. 3, according to the present disclosure.
Figure 3:
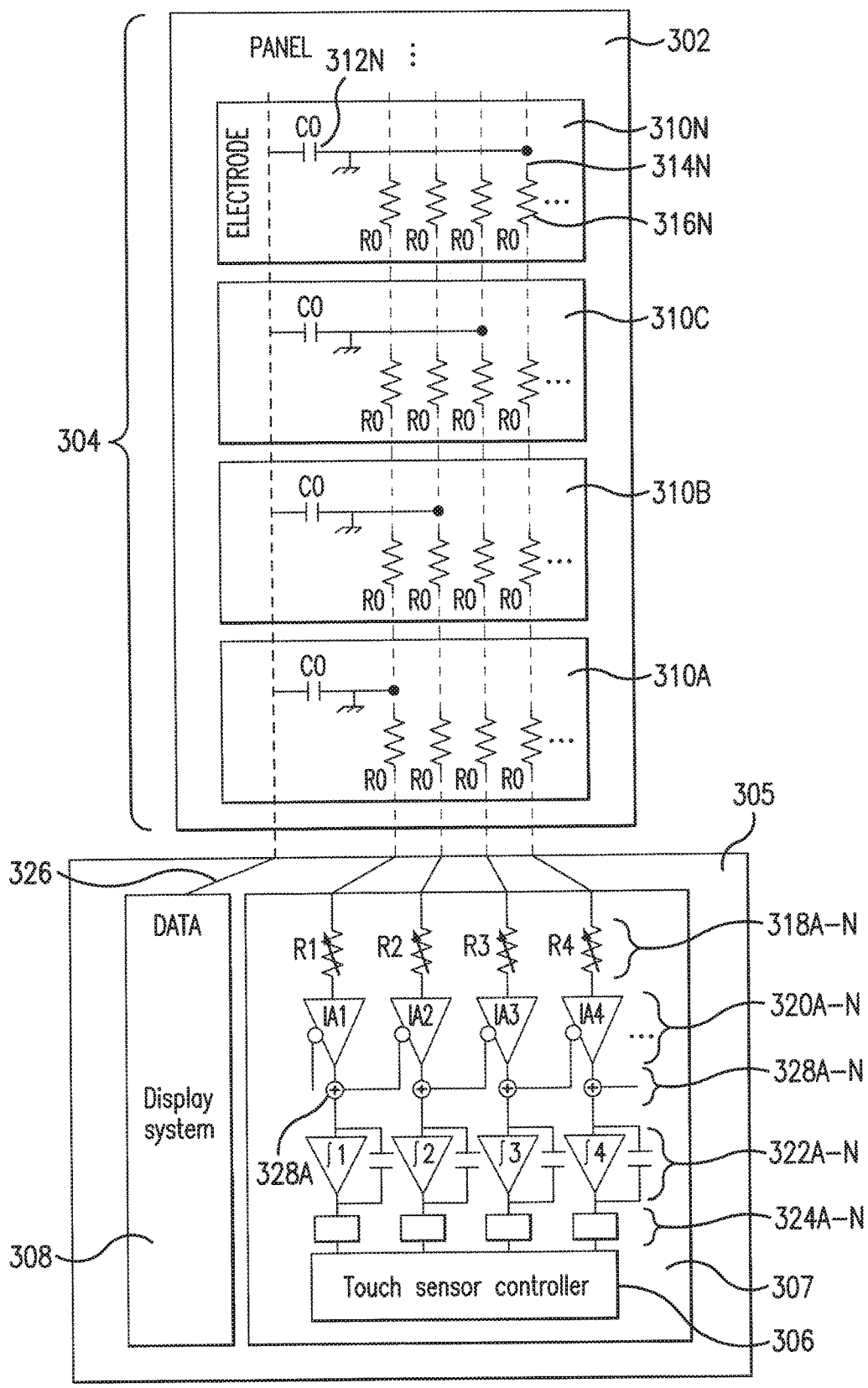
FIG. 3 illustrates an embodiment of a display panel including an in-cell touch sensor connected to an integrated in-cell touch and display system containing a touch system and a display system, according to the present disclosure.
Figure 4:
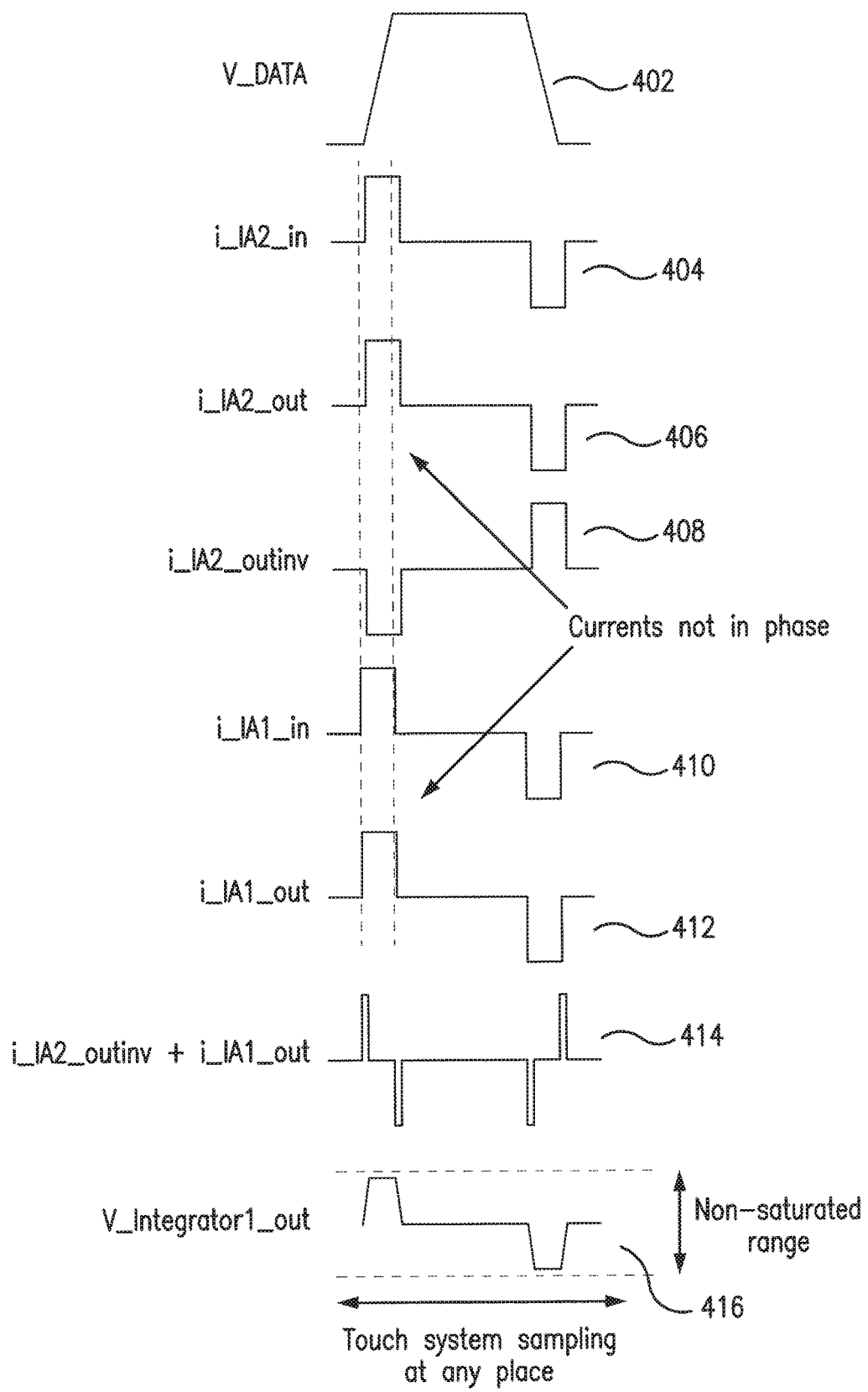
FIG. 4 illustrates certain input and output signals from elements shown in FIG. 3 when no rheostats are used, causing noise to be sampled, according to an embodiment of the present disclosure.
Figure 5:
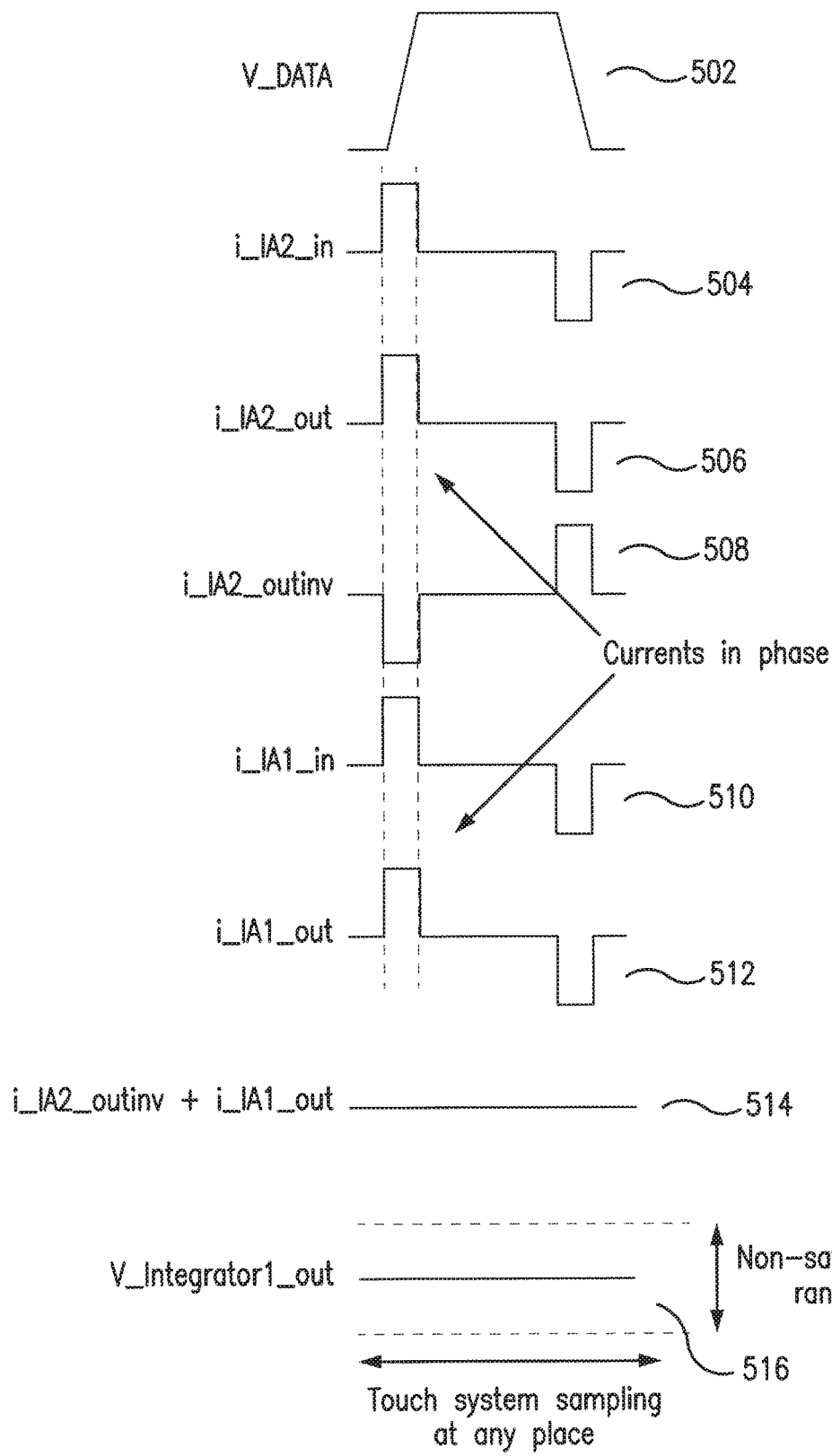
FIG. 5 illustrates certain input and output signals from elements shown in FIG. 3 when rheostats are used, causing no noise to be sampled, according to an embodiment of the present disclosure.
Figure 6:
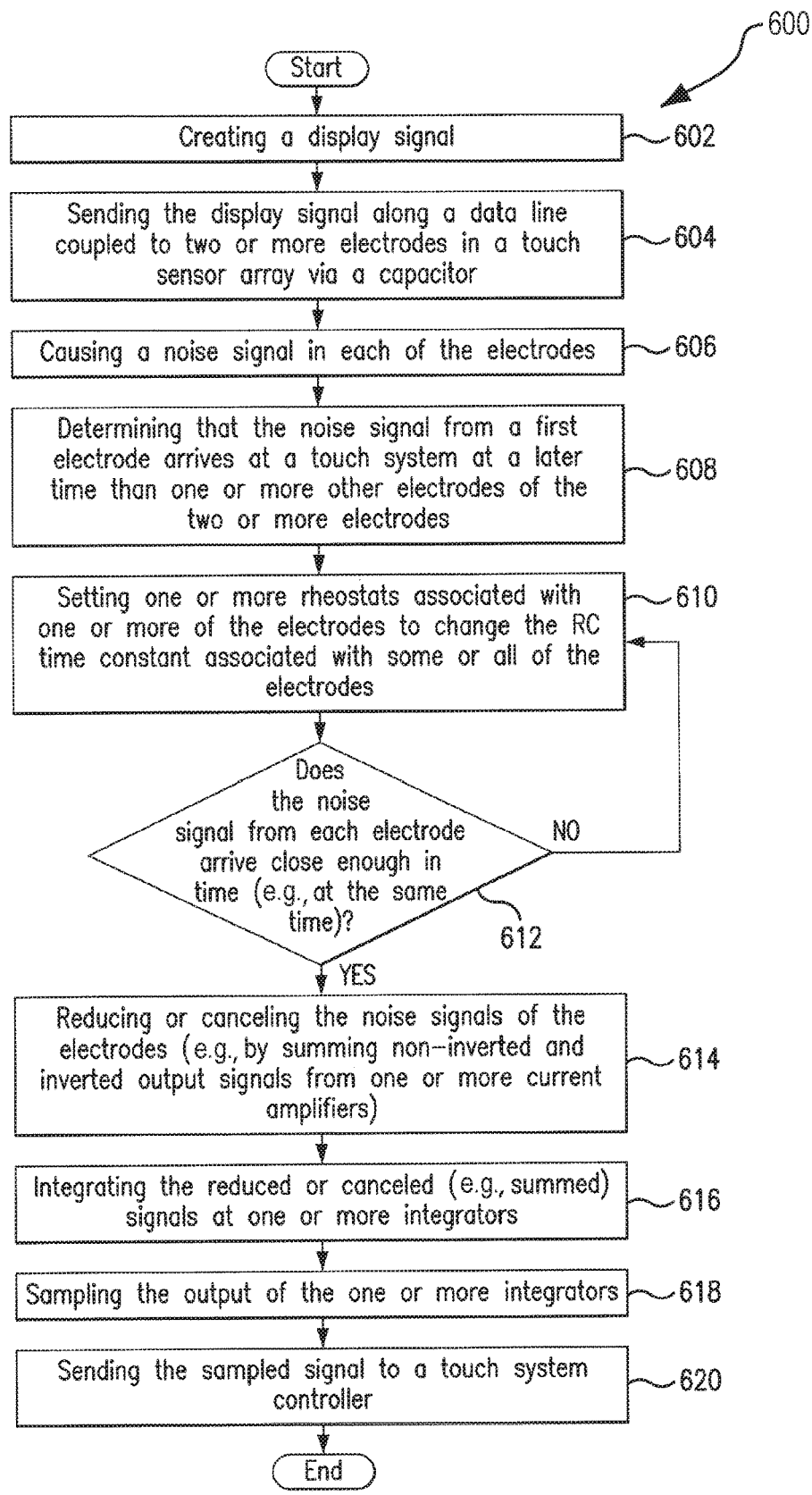
FIG. 6 illustrates, in a flow chart, a method for reducing noise, according to an embodiment of the present disclosure.

Embodiments of this disclosure will be described in more detail using FIGS. 1 through 6. FIGS. 1 and 2 will describe a touch sensor device generally. FIG. 3 will describe a display panel having an in-cell touch sensor according to embodiments of this disclosure. FIGS. 4 and 5 will describe input and output signals of certain components presented in FIG. 3, using multiple graphs over the same period of time. FIG. 6 will describe a method of reducing noise in touch sensors, for example, in-cell touch sensors, according to embodiments of the disclosure.

FIG. 1 illustrates a system 100 that includes a touch sensor 102, according to an embodiment of the present disclosure. Touch sensor 102 includes touch sensor array 106 and touch sensor controller 108. Touch sensor array 106 and touch sensor controller 108 are configured to detect the presence and position of a touch or the proximity of an object within a touch-sensitive area of touch sensor array 106.

Touch sensor array 106 includes one or more touch-sensitive areas. In one embodiment, touch sensor array 106 includes an array of electrodes disposed on one or more substrates, which comprise a dielectric material. Reference to a touch sensor array may encompass both the electrodes of touch sensor array 106 and the substrate(s) on which they are disposed. Alternatively, reference to a touch sensor array may only encompass the electrodes of touch sensor array 106, but not the substrate(s) on which they are disposed.

In one embodiment, an electrode may comprise an area of conductive material forming a shape, such as, for example, a disc, square, rectangle, thin line, other shape, or a combination of these shapes. One or more cuts in one or more layers of conductive material (at least in part) creates the shape of an electrode, and the area of the shape is (at least in part) bounded by those cuts. In one embodiment, the conductive material of an electrode occupies approximately 100% of the area of its shape. For example, an electrode may be made of indium tin oxide (ITO) and the ITO of the electrode may occupy approximately 100% of the area of its shape (sometimes referred to as 100% fill). In one embodiment, the conductive material of an electrode occupies less than 100% of the area of its shape. For example, an electrode may comprise fine lines of metal or other conductive material (FLM), such as, for example, copper, silver, or a copper- or silver-based material, and the fine lines of conductive material may occupy approximately 5% of the area of its shape in a hatched, mesh, or other pattern. Reference to FLM encompasses such material. Although this disclosure describes or illustrates particular electrodes made of particular conductive material forming particular shapes with particular fill percentages having particular patterns, this disclosure contemplates, in any combination, electrodes made of other conductive materials forming other shapes with other fill percentages having other patterns.

The shapes of the electrodes (or other elements) of a touch sensor array 106 constitute, in whole or in part, one or more macro-features of touch sensor array 106. One or more characteristics of the implementation of those shapes (such as, for example, the conductive materials, fills, or patterns within the shapes) constitute in whole or in part one or more micro-features of touch sensor array 106. In one embodiment, one or more macro-features of a touch sensor array 106 determine one or more characteristics of its functionality, and one or more micro-features of touch sensor array 106 determine one or more optical features of touch sensor array 106, such as transmittance, refraction, or reflection.

Although this disclosure describes a number of embodiments of electrodes, the present disclosure is not limited to these example electrodes and other embodiments of electrodes may be implemented. Additionally, although this disclosure describes a number of embodiments that include particular configurations of particular electrodes forming particular nodes, the present disclosure is not limited to these embodiments and other configurations may be implemented. In one embodiment, a number of electrodes are disposed on the same or different surfaces of the same substrate. Although this disclosure describes a number of embodiments that include particular electrodes arranged in specific, example patterns, the present disclosure is not limited to these example patterns and other electrode patterns may be implemented.

The substrate (or multiple substrates) and the conductive material forming the electrodes of touch sensor array 106 may comprise a mechanical stack of the various components. For example, the mechanical stack may include a first layer of optically clear adhesive (OCA) beneath a cover panel. The cover panel may be clear and made of a resilient material suitable for repeated touching, such as, for example, glass, polycarbonate, or poly(methyl methacrylate) (PMMA). This disclosure contemplates the cover panel being made of any suitable material. The first layer of OCA may be disposed between the cover panel and the substrate with the conductive material forming the electrodes. The mechanical stack may also include a second layer of OCA and a dielectric layer (which may be made of polyethylene terephthalate (PET) or another material, similar to the substrate with the conductive material forming the electrodes). As an alternative, a thin coating of a dielectric material may be applied instead of the second layer of OCA and the dielectric layer. The second layer of OCA may be disposed between the substrate with the conductive material making up the electrodes and the dielectric layer, and the dielectric layer may be disposed between the second layer of OCA and an air gap to a display of a device including touch sensor array 106 and touch sensor controller 108. For example, the cover panel may have a thickness of approximately 1 millimeter (mm); the first layer of OCA may have a thickness of approximately 0.05 mm; the substrate with the conductive material forming the electrodes may have a thickness of approximately 0.05 mm; the second layer of OCA may have a thickness of approximately 0.05 mm; and the dielectric layer may have a thickness of approximately 0.05 mm.

Although this disclosure describes a particular mechanical stack with a particular number of particular layers made of particular materials and having particular thicknesses, this disclosure contemplates other mechanical stacks with any number of layers made of any materials and having any thicknesses. For example, in one embodiment, a layer of adhesive or dielectric may replace the dielectric layer, second layer of OCA, and air gap described above, with there being no air gap in the display. As another example, some or all of a mechanical stack comprising or containing an electrode or array of electrodes may be embedded within layers of the display itself, such as with an in-cell touch sensor. Any suitable in-cell touch sensor is contemplated in this disclosure, and these in-cell touch sensors are contemplated to have any suitable configuration, materials, properties, orientation, layout, etc.

One or more portions of the substrate of touch sensor array 106 may be comprise polyethylene terephthalate (PET) or another material. This disclosure contemplates any substrate with portions comprising any suitable material(s). In one embodiment, one or more electrodes in touch sensor array 106 comprise or consist of ITO. Additionally or alternatively, one or more electrodes in touch sensor array 106 may comprise fine lines of metal or other conductive material. For example, one or more portions of the conductive material may be copper or copper-based and have a thickness of approximately 5 microns ($\mu$m) or less and a width of approximately 10 $\mu$m or less. As another example, one or more portions of the conductive material may be silver or silver-based and similarly have a thickness of approximately 5 $\mu$m or less and a width of approximately 10 $\mu$m or less. This disclosure contemplates any electrodes made of any suitable materials.

In one embodiment, touch sensor array 106 is configured to implement a capacitive form of touch sensing. In a self-capacitance implementation, touch sensor array 106 includes an array of electrodes of a single type, each electrode forming a capacitive node. When an object touches or comes within proximity of the capacitive node (e.g., by physically touching a cover layer proximate the node or hovering over the cover layer within a detectable proximity of the node), a change in self-capacitance occurs at the capacitive node and touch sensor controller 108 measures the change in capacitance, for example, as a change in the amount of charge implemented to raise the voltage at the capacitive node by a predetermined amount. By measuring changes in capacitance throughout the array, touch sensor controller 108 determines the position of the touch or proximity within touch-sensitive areas of touch sensor array 106. This disclosure contemplates any form of capacitive touch sensing, as well as any other type of touch sensing.

As described above, a change in capacitance may indicate a touch or proximity input at the position of the electrode. Touch sensor controller 108 detects and processes the change in capacitance to determine the presence and position of the touch or proximity input. In one embodiment, touch sensor controller 108 then communicates information about the touch or proximity input to one or more other components (such as one or more central processing units (CPUs)) of a device that includes touch sensor array 106 and touch sensor controller 108, which may respond to the touch or proximity input by initiating a function of the device (or an application running on the device). Although this disclosure describes a particular touch sensor controller 108 having particular functionality with respect to a particular device and a particular touch sensor 102, this disclosure contemplates other touch sensor controllers having any functionality with respect to any device and any touch sensor.

In one embodiment, touch sensor controller 108 is implemented as one or more integrated circuits (ICs), such as, for example, general-purpose microprocessors, microcontrollers, programmable logic devices or arrays, application-specific ICs (ASICs). Touch sensor controller 108 comprises any combination of analog circuitry, digital logic, and digital non-volatile memory. In one embodiment, touch sensor controller 108 is disposed on a flexible printed circuit (FPC) bonded to the substrate of touch sensor array 106, as described below. The FPC may be active or passive. In one embodiment, multiple touch sensor controllers 108 are disposed on the FPC.

In an implementation of one embodiment, touch sensor controller 108 includes a processor unit, a drive unit, a sense unit, and a storage unit. In such an implementation, the drive unit supplies drive signals to the electrodes of touch sensor array 106, and the sense unit senses charge at the electrodes of touch sensor array 106 and provides measurement signals to the processor unit representing capacitances. The processor unit controls the supply of drive signals to the electrodes by the drive unit and processes measurement signals from the sense unit to detect and process the presence and position of a touch or proximity input within touch-sensitive areas of touch sensor array 106. The processor unit also tracks changes in the position of a touch or proximity input within touch-sensitive areas of touch sensor array 106. The storage unit stores programming for execution by the processor unit, including programming for controlling the drive unit to supply drive signals to the drive electrodes, programming for processing measurement signals from the sense unit, and other programming. Although portions of this disclosure describe a particular touch sensor controller 108 having a particular implementation with particular components, this disclosure contemplates touch sensor controllers having other implementations with other components.

Tracks 110 of conductive material disposed on the substrate of touch sensor array 106 couple the electrodes of touch sensor array 106 to connection pads 112, also disposed on the substrate of touch sensor array 106. As described below, connection pads 112, which may also be characterized as terminal pads, facilitate coupling of tracks 110 to touch sensor controller 108. Tracks 110 may extend into or around (e.g., at the edges of) touch-sensitive areas of touch sensor array 106. In one embodiment, particular tracks 110 provide connections for coupling touch sensor controller 108 to electrodes of touch sensor array 106, through which the drive unit of touch sensor controller 108 supplies drive signals to the electrodes, and other tracks 110 provide sense connections for coupling touch sensor controller 108 to electrodes of touch sensor array 106, through which the sense unit of touch sensor controller 108 senses charge at the electrodes of touch sensor array 106.

Tracks 110 are made of fine lines of metal or other conductive material. For example, the conductive material of tracks 110 comprise copper or a copper-based material and have a width of approximately 100 μm or less. As another example, the conductive material of tracks 110 comprise silver or a silver-based material and have a width of approximately 100 μm or less. In one embodiment, tracks 110 comprise or consist of ITO in addition, or as an alternative to, the fine lines of metal or other conductive material. Although this disclosure describes particular tracks made of particular materials with particular widths, this disclosure contemplates tracks made of other materials and/or other widths. In addition to tracks 110, touch sensor array 106 may include one or more ground lines (not shown) terminating at a ground connector (which may be a connection pad 112) at an edge of the substrate of touch sensor array 106 (similar to tracks 110).

Connection pads 112 may be located along one or more edges of the substrate, outside a touch-sensitive area of touch sensor array 106. As described above, touch sensor controller 108 may be on a flexible printed circuit (an FPC). Connection pads 112 may comprise the same material as tracks 110 and may be bonded to the FPC using an anisotropic conductive film (ACF). In one embodiment, connection 114 includes conductive lines on the FPC coupling touch sensor controller 108 to connection pads 112, in turn, coupling touch sensor controller 108 to tracks 110 and to the drive or sense electrodes of touch sensor array 106. In another embodiment, connection pads 112 may be connected to an electro-mechanical connector (such as, for example, a zero insertion force wire-to-board connector). Connection 114 may or may not include an FPC. This disclosure contemplates any connection 114 between touch sensor controller 108 and touch sensor array 106.

FIG. 2 illustrates an example device 200 that houses the touch sensor 102 of FIG. 1 and/or the display panel including an in-cell touch sensor of FIG. 3, according to an embodiment of the present disclosure. Device 200 may be any personal digital assistant, cellular telephone, smartphone, tablet computer, and the like. In one embodiment, device 200 may include or be incorporated into other types of devices, such as automatic teller machines (ATMs), home appliances, personal computers, and any other such device having a touch screen. In the illustrated example, components of system 100 are internal to device 200. Although this disclosure describes a particular device 200 having a particular implementation with particular components, this disclosure contemplates any device 200 having any implementation with any components.

A particular implementation of an embodiment of device 200 is a smartphone that includes a housing 201 and a touch screen display 202 occupying a portion of a surface 204 of housing 201 of device 200. In an embodiment, housing 201 is an enclosure of device 200 and which contains internal components (e.g., internal electrical components) of device 200. Touch sensor 102 may be coupled, directly or indirectly, to housing 201 of device 200. Touch screen display 202 may occupy a significant portion or all of a surface 204 (e.g., one of the largest surfaces 204) of housing 201 of device 200. Reference to a touch screen display 202 includes cover layers that overlay the actual display and touch sensor elements of device 200, including a top cover layer (e.g., a glass cover layer). In certain embodiments, one or more of the touch sensor elements are embedded within the display itself, such as with in-cell touch sensors. In the illustrated example, surface 204 is a surface of the top cover layer of touch screen display 202. In an embodiment, the top cover layer (e.g., a glass cover layer) of touch screen display 202 is considered part of housing 201 of device 200.

In one embodiment, the large size of touch screen display 202 allows the touch screen display 202 to present a wide variety of data, including a keyboard, a numeric keypad, program or application icons, and various other interfaces. In one embodiment, a user may interact with device 200 by touching touch screen display 202 with a stylus, a finger, or any other object in order to interact with device 200 (e.g., select a program for execution or to type a letter on a keyboard displayed on the touch screen display 202). In one embodiment, a user may interact with device 200 using multiple touches to perform various operations, such as to zoom in or zoom out when viewing a document or image. In one embodiment, touch screen display 202 is configured to not change or change only slightly during device operation, and to recognize only single touches.

Users may interact with device 200 by physically impacting surface 204 (or another surface) of housing 201 of device 200, shown as impact 206, using an object 208, such as, for example, one or more fingers, one or more styluses, or other objects. In one embodiment, surface 204 is a cover layer that overlies touch sensor array 106 and a display of device 200. In an embodiment, surface 204 is a cover layer that overlies in-cell touch sensor 304 and display panel 302 of FIG. 3. Touch sensor 102/in-cell touch sensor 304 detects these touches and device 200 may be programmed to respond to these detected touches in any manner.

Device 200 may include buttons 210a-210c, which may be used to perform any purpose in relation to the operation of device 200. One or more of buttons 210a-210c (e.g., button 210b) may operate as a so-called "home button" that, at least in part, indicates to device 200 that a user is preparing to provide input to touch sensor 102 of device 200.

FIG. 3 illustrates a display panel 302 including an in-cell touch sensor 304 connected to an integrated in-cell touch and display system 305 containing a touch system 307 and a display system 308, according to an embodiment of the present disclosure. Display panel 302 includes a multitude of pixels (not shown) and, in certain embodiments, multiple display layers. Touch system 307 contains, among other elements, touch sensor controller 306. In display panel 302, in-cell touch sensor 304 (also referred to as touch sensor 304) includes a plurality of electrodes 310A-310N, each containing a capacitor 312A-312N, a sense line 314A-314N, and a resistor 316A-316N. In this example, electrodes 310A-310N have the same general structure, except that each electrode A-N has capacitor A-N connect to a different sense line 314A-314N. Sense lines 314A-314N connect to rheostats (variable resistors) 318A-318N, which in turn connect to current amplifiers 320A-320N, which in turn connect to summing nodes 328A-328N, which in turn connect to integrators 322A-322N, which in turn connect to samplers 324A-324N, which finally connect to touch sensor controller 306. Display system 308 connects to data line 326, and data line 326 is coupled to each electrode 310A-310N via capacitors 312A-312N.

Display panel 302 is an in-cell panel that includes both a display panel and a touch sensor 304. Display panel 302 contains a number of pixels, each of which are communicatively coupled to one or more data lines 326 in some embodiments. In general, display panel 302 displays an image on a device, e.g., on a mobile phone or tablet computer. In certain embodiments, display panel 302 includes multiple display layers, e.g., one or more of a cover layer (e.g., glass or plastic), an array of pixels, touch sensors, sense lines, other components discussed in this disclosure, and any other suitable components/layers arranged in any suitable manner.

Touch sensor 304 generally senses a touch on or around one or more locations on display panel 302. For example, touch sensor 304 senses a touch (direct physical touch and/or hovering in a detectable proximity) of a finger, stylus, or other object on or near display panel 302 in some embodiments. In certain embodiments, touch sensor 304 senses direct physical touches and/or hovering touches where an object, such a finger, gets within a certain distance of a display panel, a cover layer, or any other suitable component of a device containing touch sensor 304. For purposes of this disclosure, it will be understood that a touch could refer to a physical contact touch (e.g., where an object physically contacts a cover layer overlaying the touch sensor) or a hovering or "virtual" touch (e.g., where an object comes within a detectable range of the touch sensor without physically contacting the cover layer). Touch sensor 304 contains a number of electrodes 310, which are connected to integrated in-cell touch and display system 305, and specifically to touch system 307 and (ultimately) to touch sensor controller 306 in certain embodiments. In certain embodiments, the in-cell touch sensor is one or more layers of the display layers of display panel 302 (e.g., embedded within display layers of display panel 302). While one configuration of touch sensor 304 is shown in FIG. 3, this disclosure contemplates any suitable configuration of touch sensor 304.

Each electrode 310A-310N generally assists in locating a touch on display panel 302, according to certain embodiments. Each electrode 310 (or some electrodes 310), in certain embodiments, has a capacitor 312N that connects the electrode to a data line 326, as well as a resistor 316 (shown as R0) on the sense line 314A-314N that connects to capacitor 312N. In addition, in the example of FIG. 3, each electrode 310A-310N is associated with a resistor 316A-316N on each sense line 314A-314N (as well as a capacitor connecting it to data line 326). This example shows all resistors in each electrode 310A-310N having the same resistance R0, though any suitable resistance value or configuration of resistors is contemplated inside or out of any electrode. In some embodiments, resistors 316A-316N represent the inherent resistivity of the sense lines 314A-314N connecting the electrodes 310A-310N (e.g., in an in-cell panel), which could be high due to a number of reasons like transparency, resolution, etc. Longer sense lines, in certain embodiments, may therefore present more resistivity. In certain embodiments, an electrode 310A-310N further away from touch system 307 has a larger associated total resistance along sense line 314A-314N between that electrode 310A-310N and touch system 307 than an electrode 310A-310N closer to touch system 307. Each electrode 310A-310N will have an RC time constant associated with it, which RC time constant, in certain embodiments, is the product of the capacitance of capacitor 312A-312N and the total resistance between electrode 310A-310N and touch system 307 along sense line 314A-314N. In certain embodiments, some or all of the electrodes are one or more layers of the display layers of display panel 302 (e.g., embedded within display layers of display panel 302).

Integrated in-cell touch and display system 305 contains touch system 307 and display system 308 in some embodiments. In certain embodiments, as an in-cell system, touch system 307 and display system 308 are integrated because touch sensor 304 is within display panel 302. Any suitable configuration of in-cell touch and display system 305 is contemplated. In certain embodiments, in-cell panels (or in-cell touch and display system 305) detect direct contact (physical) touches (e.g., of touch screen display 202 of FIG. 2, display panel 302, etc.), hovering touches, or both.

Touch system 307 contains components to modify and sample the signals that pass from touch sensor 304 down sense lines 314A-314N to touch system 307 in particular embodiments. In certain embodiments, touch system 307 contains rheostats 318A-318N, current amplifiers 320A-320N, summing nodes 328A-328N, integrators 322A-322N, samplers 324A-324N, and touch sensor controller 306.

Rheostats 318A-318N, in some embodiments, are variable resistors that can be set to a static resistance value (in ohms) or be changed dynamically. In general, rheostats 318A-318N add resistance between electrodes 310A-310N and touch sensor controller 306 and/or current amplifiers 320A-320N (or any other suitable element) in some embodiments. Rheostats 318A-318N can be individually set to add resistance to one or more sense lines 314N. Any suitable configuration of rheostats is contemplated. As discussed further below, in some embodiments, rheostats 318A-318N are used to linearize the signals (e.g., the RC time constants of different lines) prior to differential measurement. In certain embodiments, resistors that have a fixed resistance (not variable) are used in place of (or in addition to) rheostats. More generally, components that provide resistance (e.g., rheostats, non-variable resistors, or other components) may be used to linearize the signals, as discussed further below. "Setting" a non-variable resistor (or other component that provides resistance) can be achieved by selecting a component with the proper resistance. "Setting" a rheostat may be achieved by selecting a resistance value for the rheostat, given that it is a component with variable, selectable, resistance.

Current amplifiers 320A-320N, in particular embodiments, are operational amplifiers used to amplify current signals on, e.g., sense lines 314N. In certain embodiments, each current amplifier 320A-320N outputs a non-inverted output signal (e.g., current), which is shown in FIG. 3 as coming from the bottom of each current amplifier 320A-320N, as well as an inverted output signal (e.g., current), which is shown in FIG. 3 as coming from the side of each current amplifier 320A-320N. In some embodiments, the non-inverted and inverted outputs from a single current amplifier 320A-320N have the same magnitude and opposite sign at any point in time (such that, for example, they would cancel and sum to zero amps). In some embodiments, differential measurement is used to reduce noise. For example, in some embodiments, the non-inverted output from a first current amplifier 320A-320N is summed with an inverted output from a second current amplifier 320A-320N at a summing node 328A-328N, such that, for example, the sum of the inverted and non-inverted outputs cancel. In certain embodiments, the inverted and non-inverted outputs may not cancel (e.g., may be reduced in amplitude), or may cancel or be reduced at some times but not at others. Any suitable configuration of current amplifiers 320A-320N is contemplated, and any suitable sets of outputs summed (or otherwise dealt with or processed) is contemplated.

Summing nodes 328A-328N are configured to generally sum a number of input signals to produce an output signal in certain embodiments. For example, summing nodes 328A-328N may be used to sum current (or any other suitable signal) coming from one or more current amplifiers 320A-320N. Any suitable configuration of summing nodes 328A-328N is contemplated.

Integrators 322A-322N are configured to generally integrate the input current signal in certain embodiments. For example, integrators 322A-322N may be used integrate the output from summing nodes 328A-328N. Any suitable configuration of integrators 322A-322N is contemplated.

Samplers 324A-324N are configured to generally sample a signal, e.g., at a sampling rate, and send samples to, e.g., touch sensor controller 306. For example, samplers 324A-324N may be used to sample the output signal from integrators 322A-322N (that is ultimately sourced from sense line 314A-314N) and sent the samples to touch sensor controller 306. In some embodiments, samplers 324A-324N may sample signals at a certain rate, e.g., a sampling rate. Any suitable configuration of samplers 324A-324N is contemplated.

Touch sensor controller 306 is configured to generally measure signals to determine whether a touch occurred and/or where a touch has occurred, for example, on display panel 302 and/or touch sensor 304 in certain embodiments. For example, touch sensor controller 306 is configured to measure changes in capacitance throughout an array (e.g., of electrodes 310) and determines the position of the touch or proximity within touch-sensitive areas of touch sensor 304. This disclosure contemplates any suitable form of touch sensing. For example, touch sensor controller 306 may have none, some, or all of the same properties as touch sensor controller 108 in FIG. 1. In certain embodiments, display system 308 contains or has access to a processor, memory, and any other suitable components to carry out its function. Any suitable configuration of touch sensor controller 306 is contemplated.

Display system 308 is configured to generate signals related to display panel 302 in certain embodiments. For example, display system 308 may send signals along data line 326 toward one or more pixels in display panel 302. In some embodiments, display system 308 may generate signals to refresh one or more pixels in display panel 302 and/or to cause the one or more pixels to (or not to) output light or color. In some embodiments, display system 308 may send signals out along one or more data lines 326 at a certain rate, for example, a given refresh rate. The refresh rate may be the same or different from the sampling rate of one or more samplers 324A-324N in particular embodiments. In certain embodiments, display system 308 contains or has access to a processor, memory, and any other suitable components to carry out its function. Any suitable configuration of display system 308 is contemplated.

Data line 326 is operably coupled to carry signals from display system 308 to one or more pixels in display panel 302 in certain embodiments. In some embodiments, multiple data lines 326 are connected to display system 308, and may send signals to any combination of pixels in display panel 302. Data line 326 connects to one or more electrodes 310A-310N via capacitors 312A-312N, which may or may not have the same capacitance value. In some embodiments, each pixel of display panel 302 has a data line 326 and in some embodiments each data line 326 serves three pixels. In certain embodiments, each electrode covers multiple pixels, e.g., three. Thus, each electrode may connect to one or more data line 326, and each data line 326 may connect to one or more electrode, depending on the embodiment. Any suitable configuration of one or more data lines 326 is contemplated.

In the example of FIG. 3, in display panel 302 electrodes 310A-310N are lined up and sensed in a plurality of columns, though other configurations are contemplated. A portion of one column is shown in FIG. 3. Each electrode 310 within the same column will couple to the same data lines 326 and will see a coupling capacitance (e.g., C0 if all capacitors 312A-312N have the same capacitance) to those lines (at capacitors 312A-312N) in this example. In certain embodiments, display system 308 toggles sending signals along data lines 326 (e.g., at a certain rate) when display system 308 is updating display panel 302 (e.g., sending signals to any number of pixels in display panel 302 to refresh/create an image), and this action can cause noise from data lines 326 to be injected to electrodes 310A-310N.

In this example, a current amplifier 320A-320N (shown as "IA1" through "IA4") is connected to each electrode and amplifies the incoming noise current and outputs both an inverted and a non-inverted signal. The outputs of current amplifiers 320A-320N are connected together at summing nodes 328A-328N, such that a non-inverted output of one current amplifier 320A-320N connects to an inverted output of another current amplifier 320A-320N in certain embodiments. For example, at summing node 328A, the non-inverted noise output from current amplifier 320A is summed with the inverted noise output from current amplifier 320B. In a perfect system (and in an embodiment, e.g., without rheostats 318A-318N or appropriately set rheostats 318A-318N), the summed signal entering integrators 322A-322N (and eventually touch sensor controller 306) would be zero (i.e., the noise from activity on data lines 326 would be canceled) where (1) the coupling capacitance at each capacitor 312A-312N in each electrode 310A-310N are equal, (2) the total resistor values of resistors 316A-316N between each electrode 310A-310N and integrated in-cell touch and display system 305 are equal, and/or (3) the distances between each electrode 310A-310N and touch sensor controller 306 are equal.

However, in certain embodiments, the noise current signals at summing nodes 328A-328N will not cancel due to different, non-balanced RC time constants (a.k.a., tau or "τ") between each sensed electrode (where τ=[resistance (R)][capacitance (C)]). Different electrodes produce different RC time constants due to, e.g., one or more of: different capacitances, different total resistances between each electrode 310A-310N and associated current amplifier 320A-320N, and/or different distance values between different electrodes 310A-310N. As just one example (as shown in FIG. 3), the resistance between electrode 310A and current amplifier 320A is R0, the resistance between electrode 310B and current amplifier 320B is 2R0, the resistance between electrode 310C and current amplifier 320C is 3R0, and the resistance between electrode 310N and current amplifier 320N is (N)R0. In certain embodiments, noise current traveling along sense lines 314A-314N from electrodes having larger RC time constant values will be delayed compared to noise current traveling along sense lines 314A-314N from electrodes having a smaller RC time constant. Different time constant values can therefore, e.g., cause a phase shift of one output more than another at the summing node, which can cause the noise current signal to be non-zero (e.g., at certain times or at all times). An example of this is shown in FIG. 2. In particular embodiments, the non-canceled noise signal is or becomes so large that it saturates one or more integrators 322A-322N, which could, e.g., cause the system to detect false touches and/or hide real touches. In certain embodiments, the non-canceled noise signal may be sampled by one or more samplers 324A-324N when the touch system samples, which could, e.g., cause the system to detect false touches and/or hide real touches.

To combat non-balanced RC time constants, in certain embodiments, rheostats 318A-318N are placed along some or all sense lines 314A-314N. For example, one or more rheostats 318A-318N may be located between electrodes 310A-310N (or any components thereof) and touch sensor controller 306. One or more rheostats 318A-318N may be between electrodes 310A-310N and current amplifiers 320A-320N in some embodiments. Rheostats 318A-318N may be used to linearize the RC time constants, and/or signals (or resistance) on sense lines 314A-314N. For example, in certain embodiments, rheostats 318A-318N can be set to a particular value such that the total resistance on two or more of sense lines 314A-314N is equal, and/or such that the RC time constant for each electrode 310A-310N is equal. If the capacitance of capacitors 312A-312N are not equal, in some embodiments, rheostats 318A-318N are set at values which cause the total resistance between each electrode 310A-310N and its associated current amplifier 320A-320N to be different such that the RC time constants (resistance times capacitance) for each electrode are the same. This disclosure contemplates that rheostats may be set in such a way that the total resistance for each resistor and/or the RC time constant for each resistor is not exactly equal but substantially equal. For example, total resistance and/or RC time constants from one line to the next may be within 1%, 5%, 10%, 25%, 50%, 75%, 100%, 200%, 500%, or any other suitable percentage of each other. As just one example, rheostats 318A-318N on three sense lines 314A-314N may be set such that the RC time constant value of the three electrodes 310A-310N associated with the three sense lines 314A-314N are similar such that none is more than 50% greater than the smallest RC time constant associated with one of the sense line 314A-314N.

FIG. 4 illustrates certain input and output signals from elements shown in FIG. 3 when no rheostats are used, causing noise to be sampled, according to an embodiment of the present disclosure. In general, a lack of rheostats in the system of FIG. 3 can cause different RC time constant values for each electrode 310A-310N. FIG. 4 shows that having different RC time constants can cause, for example, a phase shift (e.g., time shift) or an amplitude shift in the noise signals from different electrodes 310A-310N that can cause noise to be sampled by samplers 324A-324N and/or ultimately detected by touch sensor controller 306. Graphs 402 through 416 show certain signal inputs and outputs and measure current or voltage (as appropriate) vs. time. Each of graphs 402 through 416 shows measurements over the same period of time.

In the example of FIG. 3, electrode 310A has an RC time constant of (R0)*(C0), and electrode 310B has an RC time constant of (2R0)*(C0). In certain embodiments, any suitable RC time constants may be used.

Graph 402 shows the voltage output of a signal along data line 326. For example, this signal may be traveling to one or more pixels in display panel 302. The signal may repeat at a certain refresh rate in certain embodiments. This can cause a noise current in electrodes 310, example effects of which are shown in the remaining graphs.

Graph 404 shows the input current (caused by noise created by a signal traveling through data line 326) into current amplifier 2 (IA2). In this example, the input current of IA2 is delayed (phase shifted) compared to the input current of IA1 (shown in graph 410), because the RC time constant value of electrode 310B is larger than the RC time constant value of electrode 310A (e.g., 2R0*C0 for electrode 310B and R0*C0 for electrode 310A).

Graph 406 shows the non-inverted output of IA2. This output is amplified by current amplifier 320A in certain embodiments. In some embodiments, each current amplifier 320A-320N amplifies an input signal by the same amount (e.g., percentage or gain, etc.), and in some embodiments some or all of the current amplifiers 320A-320N amplify an input signal by different amounts.

Graph 408 shows the inverted output of IA2. This output is amplified and inverted by current amplifier 320A in certain embodiments.

Graph 410 shows the input current (caused by noise created by a signal traveling through data line 326) into IA1.

Graph 412 shows the non-inverted output current of IA1. This output is amplified by current amplifier 320B in certain embodiments. This output is amplified by current amplifier 320A in certain embodiments.

Graph 414 shows the sum of the inverted output current of IA2 and the non-inverted output current of IA1 (e.g., at summing node 328A in FIG. 3). Due to signal delay causing the current (noise) signal entering IA2 to arrive at summing node 328A slower than the current (noise) signal entering IA1, the sum of the non-inverted output of IA1 and the inverted output of IA2 is non-zero, i.e., a noise signal remains present. In this example, there is noise at the beginning and at the end of the signals (around the time where the voltage increased in data line 326 as shown in graph 402) where both signals did not overlap due to the signal delay. No noise remains in the middle where the signals did overlap, because in this example the delay between the signals was not large enough to cause no overlap in the signals, though this may occur in other embodiments (e.g., with different RC time constants, data line 326 signals, etc.). This is repeated, with opposite signs, around the time where the voltage decreased in graph 402.

Graph 416 shows the voltage output of integrator 1, which integrates the summed signal in graph 414. In this example, the noise signal that exists after the summing (in graph 414) causes a noise voltage output from integrator 1. Here, the noise voltage is within the non-saturated range of the integrator, though it could, in other examples, saturate the integrator output. Noise output from the integrator can cause, e.g., false touches or non-touches, reduced signal-to-noise ratio (SNR), and/or clipping of the signal (such as when the noise saturates the integrator). In certain embodiments, samplers 324A-324N may sample the integrator output, which can occur at any time. Thus, the samplers may or may not sample any of the voltage noise signals from integrator 1 in this example, depending on the refresh rate of the data line 326 and/or the sampling rate of the sampler 324A-324N.

FIG. 5 illustrates certain input and output signals from elements shown in FIG. 3 when rheostats are used, causing no noise to be sampled, according to an embodiment of the present disclosure. In general, FIG. 5 shows that when rheostats 318A-318N are set such that the RC time constants for each electrode 310A-310N are equal (or substantially equal), no or very little (substantially no) noise reaches samplers 324A-324N and/or touch sensor controller 306. Graphs 502 through 516 show certain signal inputs and outputs and measure current or voltage (as appropriate) vs. time. Each of graphs 502 through 516 shows measurements over the same period of time. Graphs 502 through 516 correspond to graphs 402 through 416 of FIG. 4, respectively.

In the example of FIG. 5, electrode 310A has an RC time constant of (R0+R1)*(C0) (where rheostat 318A, R1, is set to R0 thus equaling (2R0)*(C0)), and electrode 310B has an RC time constant of (2R0)*(C0) (where rheostat 318B, R2, is set to 0—or not included). Thus, the two RC time constants are the same in this example, (2R0)*(C0). In certain embodiments, any suitable RC time constants may be used and rheostats 318A-318N may be set to reduce the difference between RC time constants, if not eliminate it.

Graph 502 shows the voltage output of a signal along data line 326A-326N. For example, this signal may be traveling to one or more pixels in display panel 302. The signal may repeat at a certain refresh rate in certain embodiments. This can cause a noise current in electrodes 310A-310N, example effects of which are shown in the remaining graphs.

Graph 504 shows the input current (caused by noise created by a signal traveling through data line 326A-326N) into current amplifier 2 (IA2). In this example, the input current of IA2 arrives at the same time as the input current of IA1 (shown in graph 510), because the RC time constant value of electrode 310B is the same as the RC time constant value of electrode 310A (e.g., 2R0*C0).

Graph 506 shows the non-inverted output of IA2. This output is amplified by current amplifier 320A in certain embodiments. In some embodiments, each current amplifier 320A-320N amplifies an input signal by the same amount (e.g., percentage or gain, etc.), and in some embodiments some or all of the current amplifiers 320A-320N amplify an input signal by different amounts.

Graph 508 shows the inverted output of IA2. This output is amplified and inverted by current amplifier 320A in certain embodiments.

Graph 510 shows the input current (caused by noise created by a signal traveling through data line 326) into IA1.

Graph 512 shows the non-inverted output current of IA1. This output is amplified by current amplifier 320B in certain embodiments. This output is amplified by current amplifier 320A in certain embodiments.

Graph 514 shows the sum of the inverted output current of IA2 and the non-inverted output current of IA1 (e.g., at summing node 328A in FIG. 3). Because there is no signal delay between the two electrodes 310A-310N in the example, the current (noise) signal entering IA2 to arrives at summing node 328A at the same time as the current (noise) signal entering IA1, and the sum of the non-inverted output of IA1 and the inverted output of IA2 is zero in this example (or substantially zero—e.g., the current amplifiers 320A-320N amplify their current inputs by the same amount, or by different amounts to achieve the same output current magnitude for each output (one non-inverted and one inverted)), i.e., no, or substantially no, noise signal remains present.

Graph 516 shows the voltage output of integrator 1, which integrates the summed signal in graph 514. In this example, no noise signal that exists after the summing (in graph 414), which causes no voltage output from integrator 1. Thus, in certain embodiments, using rheostats to account for RC time constant differences between electrodes (and thus reduce noise) in such a system can allow the system to run at higher gains without saturation and/or also require less digital filtering to improve SNR and to allow touches to be successfully detected at any time, not just when noise (e.g., from sense line 314A-314N) is not present.

FIG. 6 illustrates a method 600 for reducing noise, according to an embodiment of the present disclosure. FIG. 6 is further described, alterable, and informed by the other figures in this disclosure, such as FIGS. 1-5 and their associated descriptions. Method 600 contains acts 602 through 620.

Act 602 includes creating a display signal, such as from display system 308. In one or more embodiments, the display signal may be control signals to control pixels of a display panel.

Act 604 includes sending the display signal along a data line (e.g., 326) coupled, via a capacitor, to two or more electrodes in a touch sensor array (e.g., touch sensor 304).

Act 606 includes causing a noise signal in each of the two or more electrodes.

Act 608 includes determining that the noise signal from a first electrode arrives at a touch system (e.g., 307) at a later time than one or more of the other electrodes of the two or more electrodes. As an example, act 608 can include determining an RC time constant for a first electrode and another RC time constant for a second electrode, and determining that the RC time constant of a first electrode (e.g., 310A) is smaller than the RC time constant of a second electrode (e.g., 310B), which can cause the noise signal to arrive from the first electrode earlier than it arrives from the second electrode.

Act 610 includes setting (tuning) a resistance value of one or more rheostats associated with one or more of the two or more electrodes to change the RC time constant associated with some or all of the electrodes. In example embodiments, the one or more rheostats are set such that the values of the first and second RC time constants are closer in value than they were before the setting the one or more rheostats, and such that the first RC time constant is within 100% of the value of the second RC time constant (or any other suitable percentage, e.g., 1%, 5%, 10%, 25%, 50%, 75%, 150%, 200%, 500%, etc.). As a further example, the one or more rheostats can be set such that a first noise signal and a second noise signal, emanating from the first and second electrodes, respectively, and responsive to a display signal sent along a data line (e.g., 326) coupled to both the first and second electrodes, arrive at a touch system closer together in time than they would before the setting of the one or more rheostats. This is determined, for example, in act 612. Act 610, in some embodiments, includes setting a first rheostat on a first sense line (associated with a first electrode) and a second rheostat on a second sense line (associated with a second electrode). Any suitable number of rheostats may be set on any suitable number of sense lines. For example, two rheostats may be associated with a particular sense line, a first rheostat configured for substantial resistance value modification, and a second rheostat configured for fine tuning of a resistance value. Similarly, a fixed value resistor and a rheostat may be associated with a particular sense line, the fixed value resistor configured, based on design parameters of a touch screen sensor, to provide RC constants within a predetermined value on different sense lines, and a rheostat configured to bring the RC constant values closer to one another.

In certain embodiments, resistors that have a fixed resistance (not variable) are used in place of (or in addition to, as noted above) rheostats. More generally, components that provide resistance (e.g., rheostats, non-variable resistors, or other components) may be used. "Setting" a non-variable resistor (or other component that provides resistance) can be achieved by selecting a component with the proper resistance or by blowing one or more fuses associated with multiple resistance elements of the component. "Setting" a rheostat may be achieved by selecting a resistance value for the rheostat (tuning), given that it is a component with variable, selectable, resistance.

Act 612 includes determining whether the noise signal from each electrode arrives close enough in time (e.g., at or substantially at the same time, or at any suitable time, which may be referred to as "linearized" or "linearization" of the time constants). In one embodiment, the determination may be made by determining if the noise signal from each electrode is sufficiently in phase with the noise signal from each other electrode. If so, method 600 proceeds to act 614. If not, method 600 returns to act 610 and one or more rheostats are set.

Act 614 includes reducing or canceling the noise signals of the electrodes, e.g., by summing non-inverted and inverted output signals from one or more current amplifiers. One example of this is shows in FIG. 3. In some embodiments, act 614 includes reducing/canceling some (e.g., 99%, 95%, 90%, 80% 75%, 66%, 50%, 40%, 25%, or any other suitable percentage) of the first noise signal (e.g., from electrode 310A, after being output from current amplifier 320A) by summing it with an inverted representation of the second noise signal (e.g., from electrode 310B, after being output from the inverted output of current amplifier 320B).

Act 616 includes integrating the reduced/canceled (e.g., summed) signals at one or more integrators.

Act 618 includes sampling the output of the one or more integrators, e.g., at a sampling rate.

Act 620 includes sending the sampled signal to a touch sensor controller (e.g., 306).

Although this disclosure describes and illustrates particular acts of the method of FIG. 6 as occurring in a particular order, this disclosure contemplates any acts of the method of FIG. 6 occurring in any order. An embodiment can repeat or omit one or more acts of the method of FIG. 6. Moreover, although this disclosure describes and illustrates particular components carrying out particular steps of the method of FIG. 6, this disclosure contemplates any combination of any components carrying out any steps of the method of FIG. 6.

In one embodiment, the RC time constants for groups of electrodes may be balanced together. In such an embodiment, the slowest electrode (e.g., most delayed) for the group may be identified and then each other electrode may have its RC time constant tuned toward the slowest electrode.

Figure 7:
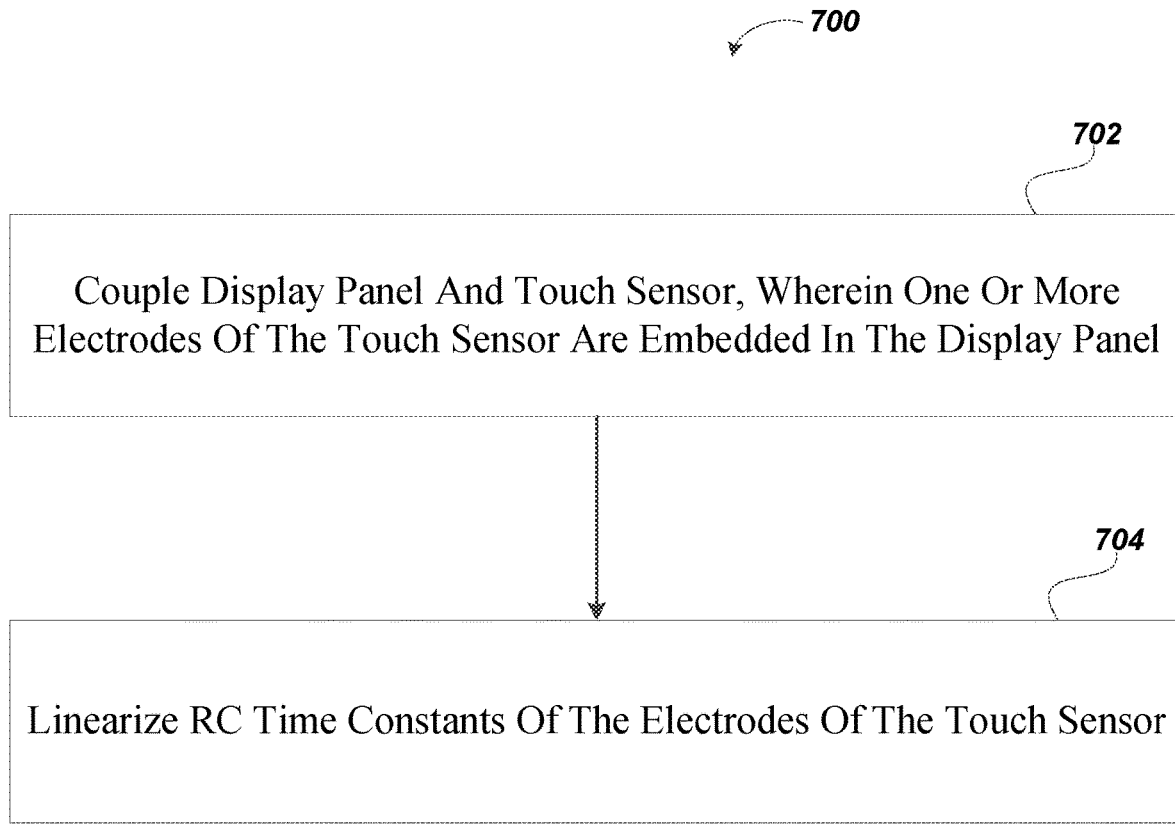
FIG. 7 illustrates a process of integrating a display panel and a touch sensing system in accordance with an embodiment of the disclosure.

FIG. 7 illustrates method 700 wherein act 702 includes coupling the display panel and touch sensor. Coupling may include the touch sensor having electrodes embedded within the display panel. Act 704 includes performing a method to linearize the RC time constants of one or more of the electrodes of the touch sensor. The method to linearize the RC time constants may, for example, be the method 600 of FIG. 6 to reduce noise.

Figure 8:
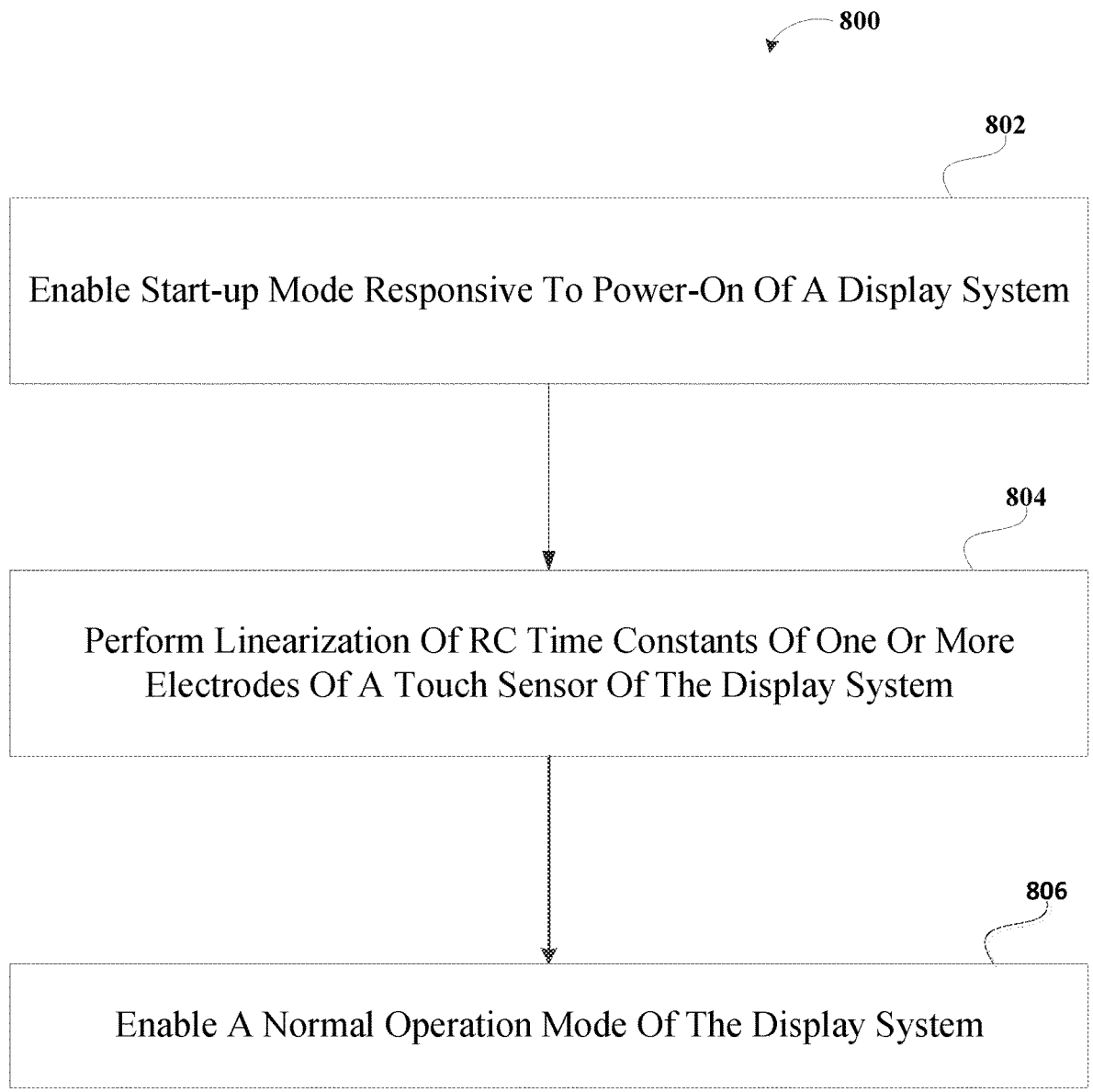
FIG. 8 illustrates a process of tuning a display system, in accordance with an embodiment of the disclosure.

FIG. 8 illustrates a method 800 for tuning a display system that includes a display panel with integrated touch sensor, in accordance with an embodiment of the disclosure. The method 800 may incorporate a method for reducing noise (such as the method 600 of FIG. 6 for reducing noise). In various embodiments the method 800 may be performed at run-time. By way of non-limiting example, the method 800 may be performed at run-time to compensate for run-time drift, which may occur due to dirty sensors, temperature extremes, humidity, or other environmental circumstances. Act 802 includes powering on the display system, which, in some embodiments, may include performing a start-up process (for example, hardware start-up) as part of a start-up mode. Act 804 includes performing a method to linearize the RC time constants of one or more of the electrodes of the touch sensor of the display system. Act 804 may be performed any time during a start-up process. Act 806 includes enabling a mode for normal operation of the display system, for example, after completing the start-up process.

While some of the embodiments herein have been described in terms of a display system and noise on a display data line, one of ordinary skill in the art will recognize that the embodiments have broader applications. By way of non-limiting example, the linearization techniques and noise mitigation techniques described herein may be used in any system where noise-coupling is possible, but a system does not know when a charge is settled and cannot (or it is not practical to) synchronize with the source of the noise.

Many of the functional units described in this specification may be labeled as modules, threads, or other segregations of programming code, in order to more particularly emphasize their implementation independence. Modules may be at least partially implemented in hardware, in one form or another. For example, a module may be implemented as a hardware circuit comprising custom VLSI circuits or gate arrays, off-the-shelf semiconductors such as logic chips, transistors, or other discrete components. A module may also be implemented in programmable hardware devices such as microcontrollers, microprocessors, configurable state machines, field programmable gate arrays, programmable array logic, programmable logic devices, or the like.

By way of non-limiting example, one or more of the functional acts illustrated in FIG. 6 may be initiated and/or performed by software executing on hardware, such as a development tool, programming tool, or set-up tool. By way of another non-limiting example, one or more of the functional acts illustrated in FIG. 6 may be implemented by an application or functional module stored in basic input/output system (BIOS) firmware.

Modules may also be implemented using software, stored on a physical storage device (e.g., a computer-readable storage medium), in memory, or a combination thereof for execution by various types of processors.

An identified module of executable code may, for instance, comprise one or more physical or logical blocks of computer instructions, which may, for instance, be organized as a thread, object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several storage or memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more physical devices, which are referred to herein as computer-readable media.

In some embodiments, the software portions are stored in a non-transitory state such that the software portions, or representations thereof, persist in the same physical location for a period of time. Additionally, in some embodiments, the software portions are stored on one or more non-transitory storage devices, which include hardware elements capable of storing non-transitory states and/or signals representative of the software portions, even though other portions of the non-transitory storage devices may be capable of altering and/or transmitting the signals. One example of a non-transitory storage device includes a read-only memory (ROM), which can store signals and/or states representative of the software portions for a period of time. However, the ability to store the signals and/or states is not diminished by further functionality of transmitting signals that are the same as or representative of the stored signals and/or states. For example, a processor may access the ROM to obtain signals that are representative of the stored signals and/or states in order to execute the corresponding software instructions.

As used herein, "each" refers to each member of a set or each member of a subset of a set. Furthermore, as used in the document "or" is not necessarily exclusive.

The scope of this disclosure encompasses all changes, substitutions, variations, alterations, and modifications to the embodiments described or illustrated herein that a person having ordinary skill in the art would comprehend, including, without limitation, modifications, additions, subtractions, and performing steps or acts differently or in a different order then described herein. The scope of this disclosure is not limited to the examples and embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or acts described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

Thus, the features of the various embodiments described herein are not mutually exclusive and can exist in various combinations and permutations, even if such combinations or permutations are not expressly described herein, without departing from the scope of the disclosure. In fact, variations, modifications, and other implementations of what is described herein will occur to one of ordinary skill in the art without departing from the scope of the disclosure. As such, the invention is not to be defined only by the preceding illustrative description, but only by the claims which follow, and legal equivalents thereof

What is claimed is:

1. A system, comprising:
a display system configured to send a display signal to one or more pixels of a display along a data line, the display comprising display layers;
an in-cell touch sensor comprising electrodes configured to provide signals for locating touches of the display, the in-cell touch sensor comprising one or more layers embedded within the display layers, wherein:
the data line is capacitively coupled to a first electrode and a second electrode of the electrodes;
a first circuit comprises the first electrode coupled to a first sense line; and
a second circuit comprises the second electrode coupled to a second sense line,
a touch sensor controller configured to receive signals from the first sense line of the first circuit and second sense line of the second circuit;
a first resistive component associated with the first sense line, wherein the first resistive component is set to a value and configured to alter a time response of the first circuit;
a second resistive component associated with the second sense line, wherein the second resistive component is set to a value and configured to alter a time response of the second circuit;
an inverter configured to receive a signal associated with the second circuit and generate an inverted signal responsive to the received signal; and
a summer, the summer configured to receive and sum a first signal associated with the first circuit and the inverted signal.

2. The system of claim 1, wherein the data line, the first electrode, and second electrode are located such that a display signal sent along the data line results in a noise signal in each of the first and second electrodes.

3. The system of claim 1, wherein:
the length of the first sense line is different from the length of the second sense line; and
a total resistance value of each of the first and second sense lines are different.

4. The system of claim 1, wherein the resistive component associated with each of the first and second electrodes comprises a resistor.

5. The system of claim 1, wherein the altered time response of the first and second circuits is an altered RC time constant, and a value of the altered RC time constant of the first circuit is within 100% of a value of the altered RC time constant of the second circuit.

6. The system of claim 1, wherein the altered time response of the first and second circuits is an altered RC time constant, and a value of an altered RC time constant of the first circuit is within 50% of a value of the altered RC time constant of the second circuit.

7. The system of claim 1, wherein the altered time response of the first and second circuits is an altered RC time constant, and a value of an altered RC time constant of the first circuit is within 5% of a value of the altered RC time constant of the second circuit.

8. The system of claim 1, further comprising:
a first current amplifier operably coupled to the first sense line between the first resistive component and the touch sensor controller, wherein:
an input of the first current amplifier is connected to the first sense line toward the first resistive component; and
a non-inverted output of the first current amplifier is connected to the first sense line toward the in-cell touch sensor; and
a second current amplifier operably coupled to the second sense line between the second resistive component and the touch sensor controller, wherein:
an input of the second current amplifier is connected to the second sense line toward the second resistive component;
a non-inverted output of the second current amplifier is connected to the second sense line toward the in-cell touch sensor; and
an inverted output of the second current amplifier is connected to the first sense line at a location between the first current amplifier and the touch sensor controller.

9. The system of claim 8, wherein the inverted output of the second current amplifier is connected to the first sense line at a summing node located between the first current amplifier and the touch sensor controller, wherein the summing node is configured to:
sum the non-inverted output of the first current amplifier and the inverted output of the second current amplifier; and
output the sum on the first sense line between the summing node and the touch sensor controller.

10. The system of claim 9, wherein an inverter is operably coupled to the first sense line between the summing node and the touch sensor controller, and wherein the input of the inverter is the output of the summing node and the output of the inverter is connected to the first sense line toward the touch sensor controller.

11. The system of claim 10, wherein a sampler is operably coupled to the first sense line between the inverter and the touch sensor controller, and wherein the input of the sampler is the output of the inverter and the output of the sampler is connected to the first sense line toward the touch sensor controller.

12. A system, comprising:
a first resistive component positioned on a first sense line connected to an in-cell touch sensor, wherein the first resistive component is set to a value configured to modify an RC time constant of a first electrode of the in-cell touch sensor connected to the first sense line;
a second resistive component positioned on a second sense line connected to the in-cell touch sensor, wherein the second resistive component is set to a value configured to modify an RC time constant of a second electrode of the in-cell touch sensor connected to the second sense line;
an inverter configured to receive a signal associated with the second electrode and generate an inverted signal responsive to the received signal;
a summer, the summer configured to receive and sum a first signal associated with the first electrode and the inverted signal; and
a touch sensor controller configured to receive signals from the first and second sense lines.

13. The system of claim 12, wherein a value of a modified RC time constant of the first electrode is within 100% of a value of a modified RC time constant of the second electrode.

14. The system of claim 12, wherein a value of a modified RC time constant of the first electrode is within 10% of a value of a modified RC time constant of the second electrode.

15. The system of claim 12, further comprising:
a first current amplifier positioned on the first sense line between the first resistive component and the touch sensor controller, wherein:
an input of the first current amplifier is connected to the first sense line toward the first resistive component; and
a non-inverted output of the first current amplifier is connected to the first sense line toward the in-cell touch sensor; and
a second current amplifier positioned on the second sense line between the second resistive component and the touch sensor controller, wherein:
an input of the second current amplifier is connected to the second sense line toward the second resistive component;
a non-inverted output of the second current amplifier is connected to the second sense line toward the in-cell touch sensor; and
an inverted output of the second current amplifier is connected to the first sense line at a location between the first current amplifier and the touch sensor controller.

16. The system of claim 15, wherein the inverted output of the second current amplifier is connected to the first sense line at a summing node located between the first current amplifier and the touch sensor controller, wherein the summing node is configured to:
sum the non-inverted output of the first current amplifier and the inverted output of the second current amplifier; and
output the sum on the first sense line between the summing node and the touch sensor controller.

17. The system of claim 16, wherein an inverter is positioned on the first sense line between the summing node and the touch sensor controller, and wherein the input of the inverter is the output of the summing node and the output of the inverter is connected to the first sense line toward the touch sensor controller.

18. The system of claim 17, wherein a sampler is positioned on the first sense line between the inverter and the touch sensor controller, and wherein the input of the sampler is the output of the inverter and the output of the sampler is connected to the first sense line toward the touch sensor controller.

19. A method, comprising:
determining a first time response for a first electrode of an in-cell touch sensor;
determining a second time response for a second electrode of the in-cell touch sensor, wherein the first time response is different than the second time response; and
setting one or more resistive components associated with at least one of the first and second electrodes, such that:
a difference between the first time response and the second time response after setting the one or more resistive components is smaller than the difference between the first time response and the second time response before setting the one or more resistive components;

the first time response being within 100% of the second time response; and a first noise signal and a second noise signal, emanating from the first and second electrodes, respectively, responsive to a display signal sent along a data line capacitively coupled to both the first and second electrodes, arrive at a touch system closer together in time than they would before the setting of the one or more resistive components and are cancelled.

20. The method of claim 19, further comprising canceling some of the first noise signal by summing it with an inverted representation of the second noise signal.

21. The method of claim 19, further comprising canceling more than 95% of the first noise signal by summing it with an inverted representation of the second noise signal.

22. The method of claim 19, wherein setting one or more components to provide resistance associated with at least one of the first and second electrodes comprises:

setting a value of a first resistive component associated with the first electrode; and setting a value of a second resistive component associated with the second electrode.

23. The method of claim 19, wherein the method is performed during a start-up mode of a display system.

24. The method of claim 19, wherein the method is performed during integration of a display panel and the in-cell touch sensor.

25. A touch screen, comprising:

a first resistive component associated with a first electrode operably coupled to a first sense line connected to an in-cell touch sensor, wherein the first resistive component is operable to modify a value of an RC time constant of the first electrode;

a second resistive component associated with a second electrode operably coupled to a second sense line connected to the in-cell touch sensor, wherein the second resistive component is operable to modify a value of an RC time constant of the second electrode;

an inverter configured to receive a signal associated with the second electrode and generate an inverted signal responsive to the received signal;

a summer, the summer configured to receive and sum a first signal associated with the first electrode and the inverted signal; and a touch sensor controller operably coupled to the first and second sense lines.

* * * * *

UNITED STATES PATENT AND TRADEMARK OFFICE
CERTIFICATE OF CORRECTION

PATENT NO. : 10,698,554 B2
APPLICATION NO. : 15/904123
DATED : June 30, 2020
INVENTOR(S) : Carl Olof Fredrik Jonsson Page 1 of 1

It is certified that error appears in the above-identified patent and that said Letters Patent is hereby corrected as shown below:

In the Specification

Column 22, Line 6, add "." at end of line

Signed and Sealed this
Nineteenth Day of January, 2021

Andrei Iancu
*Director of the United States Patent and Trademark Office*